United States Patent Office.

P. G. KENNY, OF RAHWAY, NEW JERSEY.

Letters Patent No. 66,357, dated July 2, 1867.

---

IMPROVED MANURE.

---

The Schedule referred to in these Letters Patent and making part of the same.

---

TO ALL WHOM IT MAY CONCERN:

Be it known that I, P. G. KENNY, of Rahway, in the county of Union, and State of New Jersey, have invented or discovered a certain new and useful or improved Manure, of which the following is a full, clear, and exact description.

This my invention has for its base sulphate of iron, for use in connection with stable-yard manure or other animal or vegetable refuse or substances, urine, and, it may be, aluminous earth.

The following describes a means or mode by or in which the same may be carried into effect: Put, say, farm or ordinary stable-yard manure, or other suitable animal or vegetable substances or refuse, in any suitable pit, tank, or receiver, to about the depth of one (1) foot from the bottom thereof, then sprinkle over its surface sulphate of iron, in or about the proportion of one-twentieth ($\frac{1}{20}$) of a pound to each square foot of manure, over which may be then scattered aluminous earth to the depth of about two or three inches. In connection with this manure-tank or receiver, and, arranged at a lower level than it, may be a pit or cistern, made and cemented on the interior, to give it a water-tight character, into which the urine from the stable or other troughs is allowed to run and collect. The urine thus collected should be pumped once or twice a week on to the manure, covered as described, with the sulphate of iron and aluminous earth, (if the latter be used,) and which mixture may consist of a succession or series of layers, in or about the proportions specified, of manure, sulphate of iron, and aluminous earth. The urine thus introduced on to the surface percolates through the manure, carrying and dissolving the sulphate of iron in and amongst it, and finally running back or being returned, by suitable vents, to the cistern. In this way not only is the manure rapidly decomposed, but the seeds of weeds and eggs of insects are effectually destroyed.

To ascertain when the mass is fit to be used as a fertilizer, it is only necessary to remove a little of the upper part or top layer, when, if black beneath, the mass is in a suitable condition, after being taken out and dried, for fertilizing purposes, to which it may be applied in the same manner as poudrette. The top layer, which was first removed, should be returned to the tank or receiver for subsequent similar after-treatment in connection with fresh layers in the manner described. Practical experience has proved that one load of such prepared manure is as efficient as a fertilizer as several loads of ordinary stable-yard manure.

What is here claimed as new and useful, is—

1. A fertilizer composed of farm or stable-yard manure, or other suitable animal or vegetable substances, decomposed, or having sulphate of iron admixed with or dissolved in it or them, by the passage of urine therethrough, substantially as specified.

2. The employment of aluminous earth in connection with stable-yard manure or other suitable animal or vegetable substances, and sulphate of iron, as a fertilizer, essentially as herein set forth.

P. G. KENNY.

Witnesses:
GEO. FARRELLY,
GEO. W. JONES.